(12) United States Patent
Merritt et al.

(10) Patent No.: US 10,017,258 B2
(45) Date of Patent: Jul. 10, 2018

(54) COMPRESSOR MOUNT BRACKET FOR AIRCRAFT CABIN AIR SUPPLY SYSTEM

(71) Applicant: Hamilton Sundstrand Corporation, Windsor Locks, CT (US)

(72) Inventors: Brent J. Merritt, Southwick, MA (US); Calvin R. Parent, Enfield, CT (US); Alpesh Patel, Weatogue, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 275 days.

(21) Appl. No.: 14/705,242

(22) Filed: May 6, 2015

(65) Prior Publication Data

US 2016/0325840 A1   Nov. 10, 2016

(51) Int. Cl.
*F25D 9/00* (2006.01)
*B64D 13/06* (2006.01)

(52) U.S. Cl.
CPC ...... *B64D 13/06* (2013.01); *B64D 2013/0618* (2013.01); *B64D 2013/0648* (2013.01); *Y02T 50/56* (2013.01)

(58) Field of Classification Search
CPC ........ B64D 41/00; B64D 13/02; B64D 13/00; B64D 2013/0644; F16M 9/00; F16M 3/00; F16M 3/02; B64F 5/0081
See application file for complete search history.

(56) References Cited

U.S. PATENT DOCUMENTS

| | | | |
|---|---|---|---|
| 5,553,892 A | 9/1996 | Pitchford et al. | |
| 5,954,309 A | 9/1999 | Kato et al. | |
| 6,139,211 A | 10/2000 | Schroeder et al. | |
| 6,263,954 B1 | 7/2001 | Nakayama | |
| 6,270,051 B1 | 8/2001 | Power | |
| 7,516,621 B2 | 4/2009 | Suttie et al. | |
| 7,637,521 B2 | 12/2009 | Grant | |
| 8,104,736 B2 | 1/2012 | Callaghan | |
| 8,167,540 B2 | 5/2012 | Schlinker | |
| 8,172,512 B2 | 5/2012 | Short et al. | |
| 8,955,809 B2 | 2/2015 | Vignali et al. | |
| 2014/0346315 A1* | 11/2014 | Mayo ................. | B60H 1/00535 248/674 |

* cited by examiner

*Primary Examiner* — Elizabeth Martin
(74) *Attorney, Agent, or Firm* — Carlson, Gaskey & Olds, P.C.

(57) ABSTRACT

A compressor mount bracket has a mount floor extending to be perpendicular to a square side extending away from the mount floor in a first direction. A closure side extends from the mount floor in the first direction. An outer surface faces away from the square side. An angled side extends at a non-parallel angle from the square side and back over the mount floor. A mount location extends from the angled side, and further over the mount floor. The closure side extends along the angled side and the mount location. The mount location has a first thickness, and the angled side has a second thickness. A ratio of the first thickness to the second thickness is between 1.38 and 1.63. A cabin air supply system and a method of servicing a cabin air supply system are also disclosed.

1 Claim, 5 Drawing Sheets

COMPRESSOR MOUNT BRACKET FOR AIRCRAFT CABIN AIR SUPPLY SYSTEM

BACKGROUND OF THE INVENTION

This application relates to a mount bracket which connects components of an aircraft cabin air supply system.

Aircraft are typically provided with an air supply system which conditions and supplies air for use as cabin air. The systems typically provide an air cycle machine which includes a compressor and turbines that are utilized to condition air being supplied to the aircraft cabin. The air is supplied to the air cycle machine from cabin air compressors.

There are ducts and any number of flow manifolds as part of the cabin air supply system.

In the prior art, a plurality of mount brackets mount the entire system to an aircraft frame. One mount area includes compressor mount brackets for being mounted to cabin air compressors. The compressor mount brackets are secured to a three-way mount that is secured to an aircraft frame.

There are concerns with regard to the strength provided by the prior art mount bracket, and the stresses it encounters.

SUMMARY OF THE INVENTION

A compressor mount bracket for use in a cabin air supply system for an aircraft has a mount floor extending to be perpendicular to a square side extending away from the mount floor in a first direction. A closure side extends from the mount floor in the first direction. An outer surface faces away from the square side. An angled side extends at a non-parallel angle from the square side and back over the mount floor. A mount location extends from the angled side, and further over the mount floor. The closure side extends along the angled side and the mount location. A flange is formed on a side of the mount location opposed to a side of the mount location connected to the closure side. The mount location has a first thickness, and the angled side has a second thickness. A ratio of the first thickness to the second thickness is between 1.38 and 1.63. A cabin air supply system and a method of servicing a cabin air supply system are also disclosed.

These and other features may be best understood from the following specification and drawings, the following which is a brief description.

DETAILED DESCRIPTION

Figure 1:
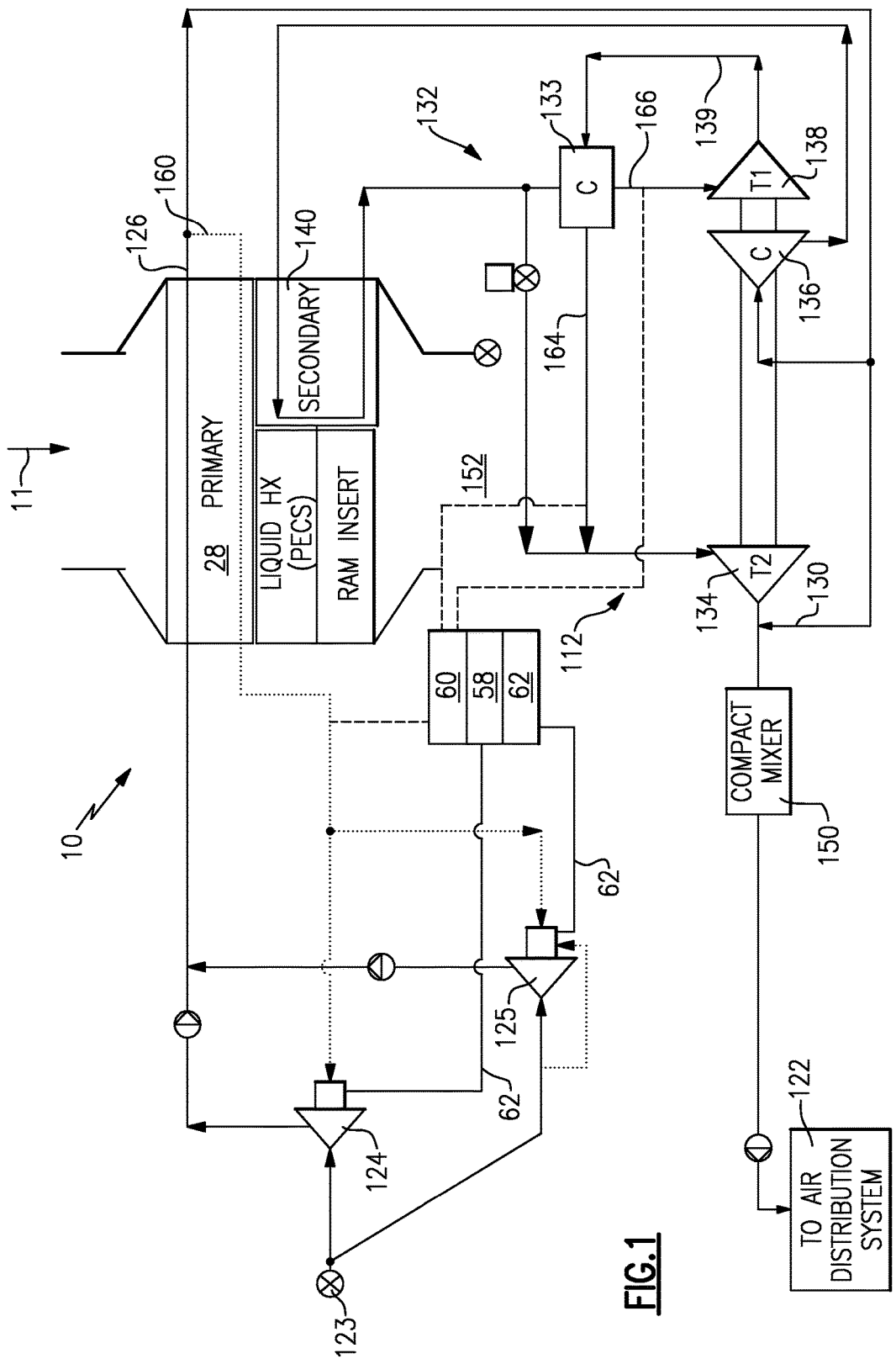
FIG. 1 schematically shows a cabin air supply system.

FIG. 1 shows cabin air supply system 10 which may be incorporated into an aircraft. A source 123 of air delivers air into a pair of cabin air supply compressors 124 and 125. The compressors 124/125 pass the air through a primary heat exchanger 28, which receives a flow of ambient air from outside of the aircraft shown schematically at 11. The air passing through the primary heat exchanger 28 moves to a supply conduit 126, and some of the air is delivered to a line 130, and then to a compact mixer 150, and to an air distribution system 122 for the aircraft. Another portion of the air is delivered to a compressor 136, and from the compressor 136 back through a secondary heat exchanger 140. Downstream of the heat exchanger 140, the air may pass to a condenser 133. The air from heat exchanger 140 passes through the condenser 133 and may drive a turbine 138, and the air downstream of the turbine 138 is returned to the condenser 133 through passage 139. The two airflow passages are maintained separate in condenser 133. Downstream of the condenser 133, the air from line 139 may pass into a line 164, leading to a second turbine 134, and then to the mixer 150. Turbines 134, 138, and compressor 136, are all part of an air cycle machine 132.

A tap 160 taps bearing cooling air for the compressors 124 and 125, as shown schematically. A mount bracket 62/58 is shown schematically in FIG. 1. A manifold 60 distributes air from the lines 160, 164 and 166, all of which are shown schematically by dashed lines. In general, the manifold 60 would carry a tube that would provide a portion of the lines 160, 164 and 166.

Figure 2A:
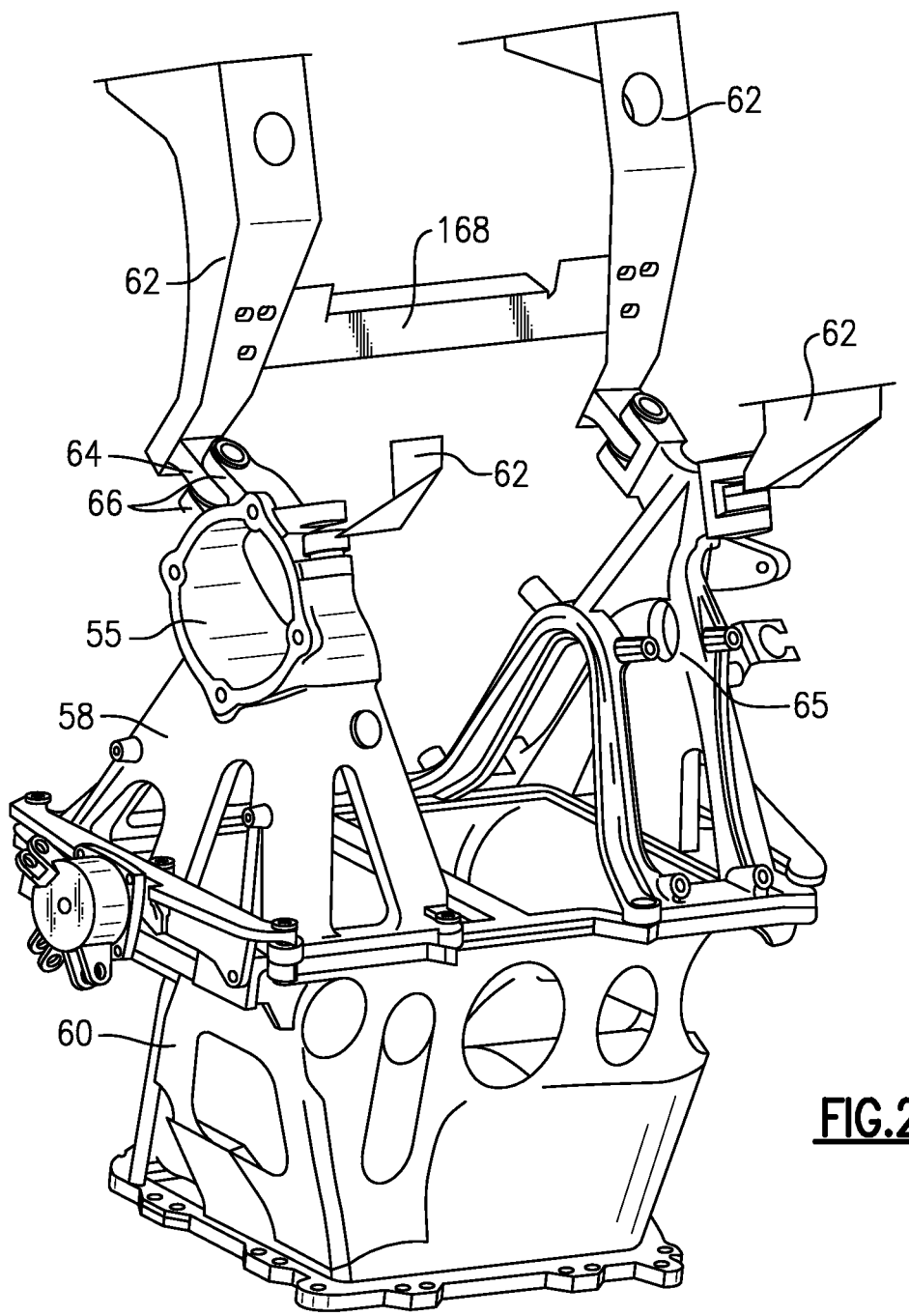
FIG. 2A is a perspective view of a detail of a mount bracket.

FIG. 2A shows compressor mount brackets 62 which connect the cabin air compressors 124 and 125 to mount brackets 58 and 65. When the system is mounted in an aircraft, the bracket 58 will be vertically above the bracket 65. Bracket 58 is known as a three-way mount bracket. As shown, the cabin air compressor brackets 62 are secured through a flange 64 to ears 66 on the mount bracket 58. A central hole 55 is connected to an aircraft frame through a vibration dampening member. A cross bracket 168 connects a pair of compressor mount brackets.

The compressor mount brackets 62 are shown as mirror image parts and are bolted at 19 to crossing bracket 18.

The forward manifold 60 communicates with ducts to supply air. In particular, portions of passages 160, 164 and 166 (not shown) pass through the forward manifold 60.

Figure 2B:
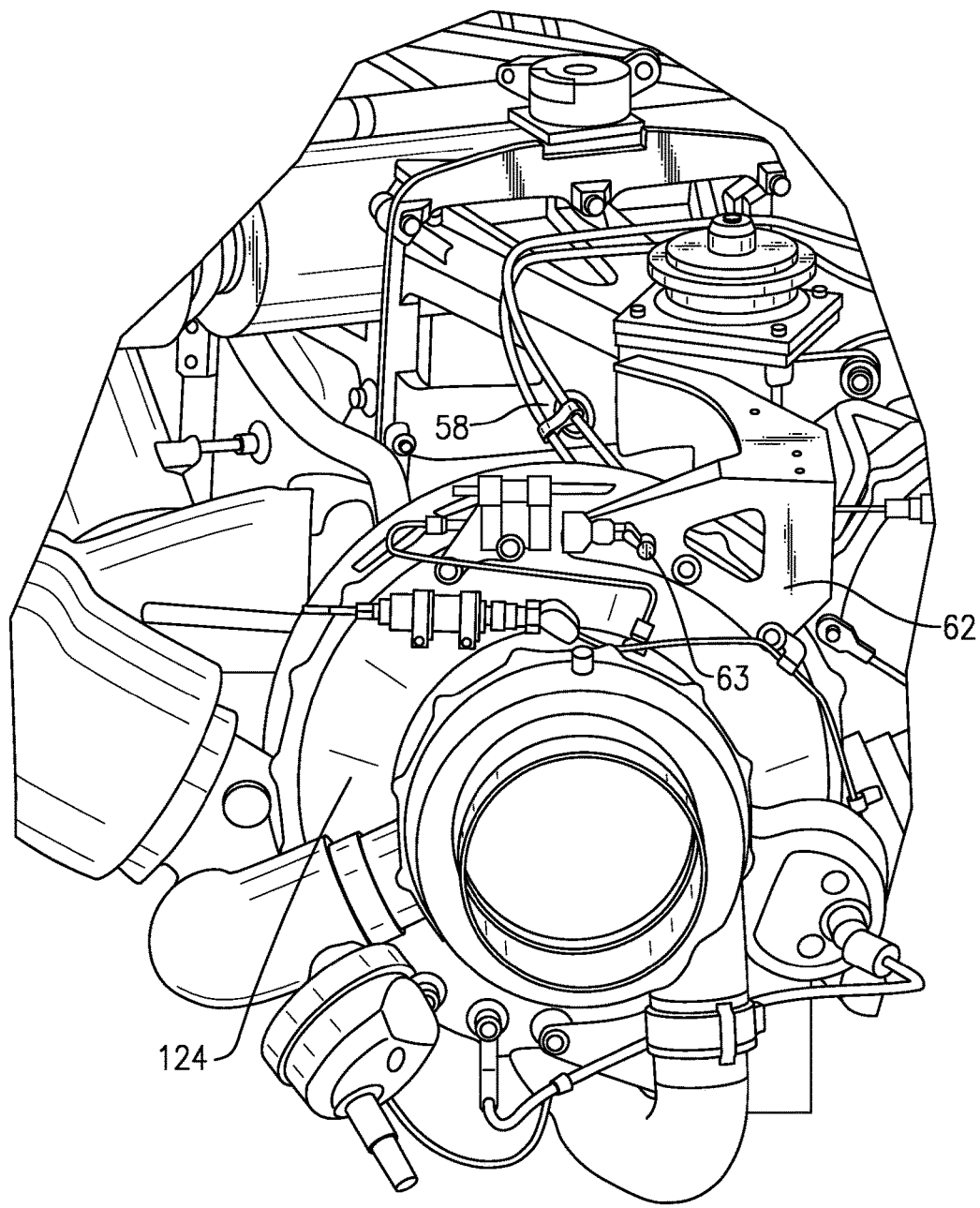
FIG. 2B shows a mount location.

FIG. 2B shows amount bracket 62 receiving bolts 63 to secure the bracket 62 to a compressor 124. The three-way mount 58 is also illustrated.

Figure 3:
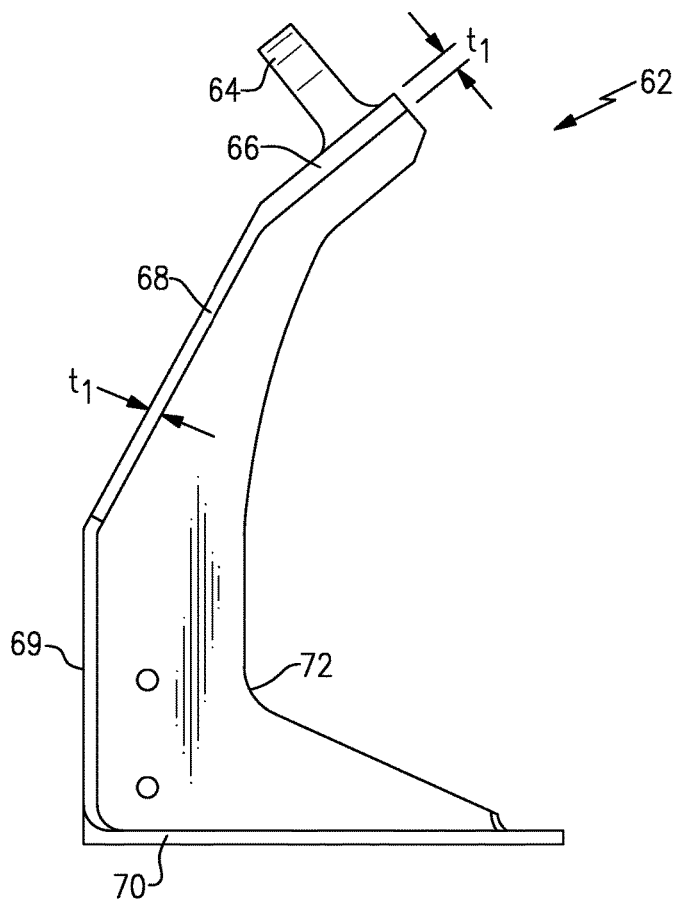
FIG. 3 is a side view of the compressor mount bracket.

FIG. 3 is a side view of a bracket 62. As shown, the flange 64 extends from a mount location 66 which has a thickness $t_1$. The mount location 66 merges into an angled side 68, which in turn merges into a square side 69. Square side 69 extends to a mount floor 70. A closure side 72 extends from floor 70 along sides 66, 68 and 69. The square side 69 is at a right angle relative to the mount floor 70. The angled side 68 is non-parallel to the square side 69, and extends from the square side 69 back over the mount floor 70. The mount location 66 is at a non-parallel angle relative to the angled side 68, and extends further over the mount floor 70. The thickness at the extending angled side 68 is $t_2$.

Figure 4:
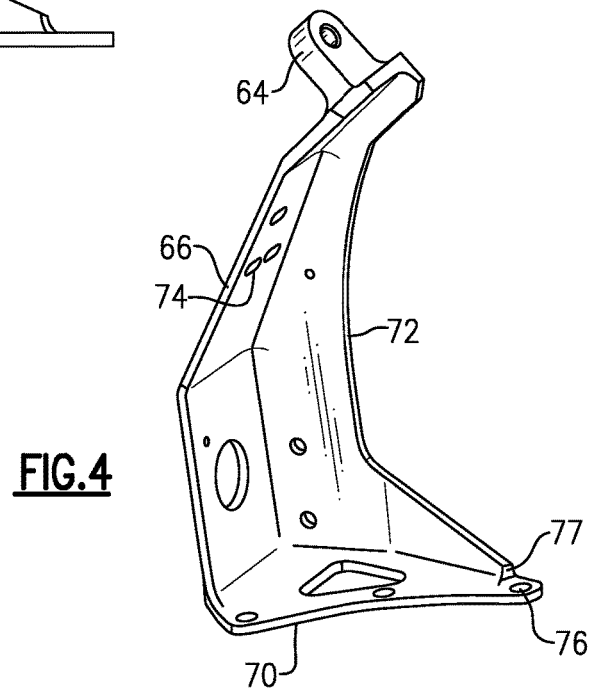
FIG. 4 is a perspective view of the compressor mount bracket.

As shown in FIG. 4, bolt holes 74 are formed in the angled side 66, and will receive bolts to connect to the crossing bracket 18. The floor 70 has a bolt hole 76 which receives the bolt 63 to attach the bracket to the compressor, as illustrated in FIG. 2B.

The closure side 72 has a forward end 77 which ends closer to square side 69 than is hole 76. Further, square side 69 extends in a first direction away from the floor 70, and the square side extends from the mount floor in the same first direction. As can be seen, closure side 72 has a multi-sided outer surface, defined facing away from the square side 69.

Figure 5:
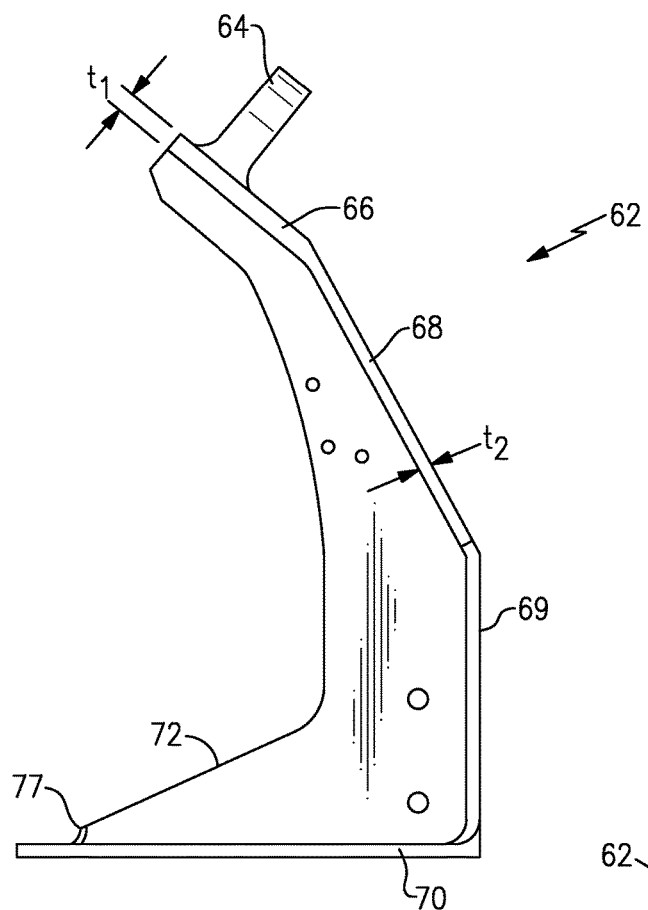
FIG. 5 shows another compressor mount bracket which is the mirror image of the FIG. 3/4 mount bracket.
Figure 6:
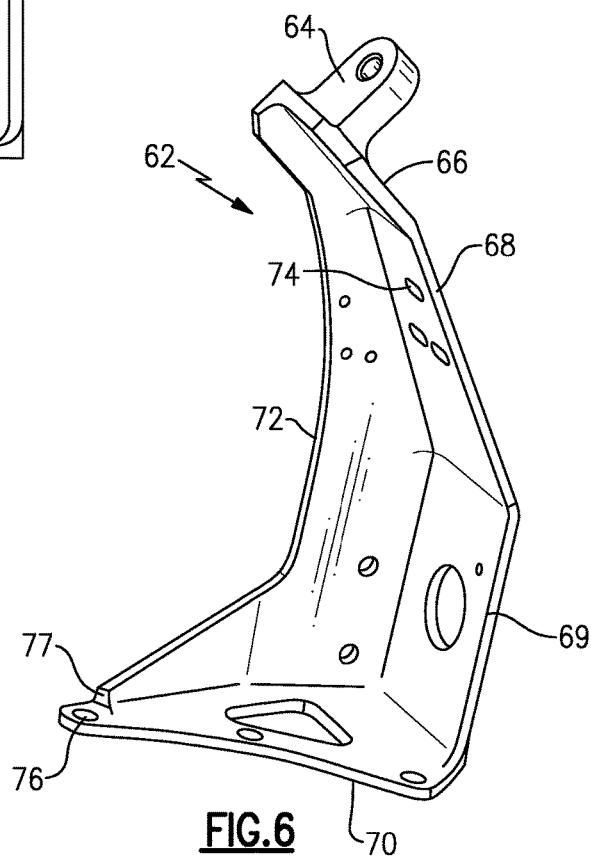
FIG. 6 shows another compressor mount bracket which is the mirror image of the FIG. 3/4 mount bracket.

FIGS. 5 and 6 show a mirror image compressor mount bracket 62. As should be appreciated, the assembly shown in FIG. 2A includes one bracket as shown in FIGS. 3/4, and one bracket as shown in FIGS. 5/6.

The following dimensions apply to both brackets illustrated in FIGS. 3-6.

In one embodiment, a diameter of the hole 76 is formed to be 0.521 inch (1.32 cm). In the prior art, this bolt hole was 0.406 inch (1.03 cm).

The thickness $t_1$ is 0.375 inch (0.952 cm). In the prior art, the thickness $t_1$ was 0.250 inch (0.635 cm). The thickness $t_2$ is 0.250 inch (0.635 cm). In the prior art, the thickness $t_2$ was 0.250 inch (0.635 cm).

In embodiments, a ratio of $t_1$ to $t_2$ was between 1.38 and 1.63. In embodiments, a ratio of the diameter of the bolt hole in the mount floor to $t_1$ was between 1.34 and 1.44.

This disclosure could be summarized as a compressor mount bracket 62 for use in a cabin air supply system for an aircraft. Bracket 62 has a mount floor 70 extending to be perpendicular to a square side 69 extending away from the mount floor in a first direction. A closure side 72 extends from the mount floor in the first direction. The closure side has an outer surface facing away from the square side. An angled side 68 extends at a non-parallel angle from the square side 69 and back over the mount floor 70. A mount location 66 extends from the angled side 68, and further over the mount floor 70. The closure side extends along the angled side 68 and the mount location 66. A flange 64 is formed on a side of the mount location opposed to a side of the mount location connected to the closure side. The mount location having a first thickness, and the angled side having a second thickness. A ratio of the first thickness to the second thickness being between 1.38 and 1.63. The mount floor 70 has a bolt hole 76 formed to be forward of a forward most end 77 of the closure side 72. The bolt hole has a diameter, and a ratio of the diameter to the first thickness is between 1.34 and 1.44.

Bolt holes 74 also extend through the angled side 68.

In a method of servicing a cabin air supply system, where the air cycle machine 10 has a condenser 133, and two outlet lines from the condenser. A pair of cabin air supply compressors 124 and 125 are mounted by compressor mount brackets 62 to a three-way mount bracket 58. The three-way mount bracket 58 further mounts a forward manifold 60. The forward manifold 60 provides a portion of a flow line for each of the outlets of the condenser 60. the manifold further receives a portion of a flow line supplying bearing cooling air tapped from a line downstream of the pair of cabin air supply compressors back to bearings of the cabin air supply compressors, and downstream of a heat exchanger.

The service method includes the steps of removing one of the compressor mount brackets 62, and replacing the removed compressor mount bracket 62 with a replacement compressor mount bracket 62 by mounting the replacement compressor mount bracket 62 to one of the cabin air supply compressors 124/125, and to the three-way mount bracket 58.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A compressor mount bracket for use in a cabin air supply system for an aircraft comprising:
    a mount floor extending to be perpendicular to a square side extending away from said mount floor in a first direction with a closure side extending from said mount floor in said first direction, and having an outer surface facing away from said square side, an angled side extending at a non-parallel angle from said square side and back over said mount floor, and a mount location extending from said angled side, and further over said mount floor, with said closure side extending along said angled side and said mount location, a flange being formed on a side of said mount location opposed to a side of the mount location connected to said closure side, and said mount location having a first thickness, and said angled side having a second thickness, and a ratio of said first thickness to said second thickness being between 1.38 and 1.63;
    said mount floor having a mount floor bolt hole formed to be forward of a forward most end of said closure side, and said mount floor bolt hole having a diameter, and a ratio of said diameter to said first thickness being between 1.34 and 1.44; and
    angled side bolt holes also extend through said angled side.

* * * * *